US012211205B2

(12) United States Patent
Zhou et al.

(10) Patent No.: US 12,211,205 B2
(45) Date of Patent: Jan. 28, 2025

(54) COMPUTER-IMPLEMENTED METHOD AND SYSTEM FOR PREDICTING ORTHODONTIC RESULTS BASED ON LANDMARK DETECTION

(71) Applicant: SHANDONG UNIVERSITY, Shandong (CN)

(72) Inventors: Yuanfeng Zhou, Jinan (CN); Chen Wang, Jinan (CN); Guangshun Wei, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 165 days.

(21) Appl. No.: 18/082,761

(22) Filed: Dec. 16, 2022

(65) Prior Publication Data

US 2023/0196570 A1 Jun. 22, 2023

(30) Foreign Application Priority Data

Dec. 20, 2021 (CN) .......................... 202111561575.7

(51) Int. Cl.
*G06T 7/00* (2017.01)
*A61C 7/00* (2006.01)
*G06F 18/25* (2023.01)
(Continued)

(52) U.S. Cl.
CPC ............ *G06T 7/0012* (2013.01); *A61C 7/002* (2013.01); *G06T 7/33* (2017.01); *G06T 17/00* (2013.01);
(Continued)

(58) Field of Classification Search
CPC ......... G06T 7/0012; G06T 7/33; G06T 17/00; G06T 2207/30036; G06T 2210/41;
(Continued)

(56) References Cited

U.S. PATENT DOCUMENTS

| 2008/0123927 A1* | 5/2008 | Miga ...................... A61B 90/36 |
| | | 382/131 |
| 2014/0180463 A1* | 6/2014 | Chishti .................. A61C 7/002 |
| | | 264/16 |

(Continued)

OTHER PUBLICATIONS

Cui et al—TSegNet An efficient and accurate tooth segmentation network on 3D dental model—2020—Elsevier (Year: 2020).*
(Continued)

*Primary Examiner* — YuJang Tswei
(74) *Attorney, Agent, or Firm* — Oliff PLC

(57) ABSTRACT

A computer-implemented method and system for predicting orthodontic results based on landmark detection includes: acquiring a crown point cloud, a set of tooth point clouds, and tooth labels; extracting global dentition features and local tooth features, performing feature fusion on the global dentition features, tooth labels of individual teeth, and the local tooth features of the individual teeth to obtain fused features of the individual teeth, and extracting landmarks of the individual teeth and offset vectors from points in the tooth point clouds to the landmarks; fusing the landmarks of the individual teeth and the tooth point clouds, extracting tooth attention features, acquiring dentition attention features, and fusing the dentition attention features, the global dentition features, and the local tooth features to obtain a point cloud with fused landmarks; and acquiring pre- and post-treatment rigid transformation parameters, and obtaining a post-treatment crown model prediction result.

9 Claims, 4 Drawing Sheets

(51) Int. Cl.
  *G06N 3/045* (2023.01)
  *G06N 3/08* (2023.01)
  *G06T 7/33* (2017.01)
  *G06T 17/00* (2006.01)
(52) U.S. Cl.
  CPC ............ *G06F 18/253* (2023.01); *G06N 3/045* (2023.01); *G06N 3/08* (2013.01); *G06T 7/0016* (2013.01); *G06T 2207/10016* (2013.01); *G06T 2207/10028* (2013.01); *G06T 2207/20081* (2013.01); *G06T 2207/20084* (2013.01); *G06T 2207/30036* (2013.01); *G06T 2210/41* (2013.01); *G06T 2210/56* (2013.01)
(58) Field of Classification Search
  CPC ....... G06T 2210/56; G06T 2207/10016; G06T 2207/10028; G06T 2207/20081; G06T 2207/20084; G06T 7/0016; A61C 7/002; G06N 3/08; G06N 3/045; G06F 18/253
  See application file for complete search history.

(56) References Cited

U.S. PATENT DOCUMENTS

| | | | |
|---|---|---|---|
| 2018/0096457 A1* | 4/2018 | Savvides | G06V 10/764 |
| 2020/0035351 A1* | 1/2020 | Kim | G16H 50/30 |
| 2021/0106403 A1* | 4/2021 | Aptekarev | A61C 7/002 |
| 2021/0174543 A1* | 6/2021 | Claessen | G06T 7/344 |
| 2021/0279950 A1* | 9/2021 | Phalak | G06T 7/55 |
| 2024/0008955 A1* | 1/2024 | Gandrud | A61C 13/0004 |

OTHER PUBLICATIONS

Rahimi et al—Machine learning and orthodontics current trends and the future opportunities A scoping review—2021—American Association of Orthodontists (Year: 2021).*

Veeraprasit1 et al—Hybrid Feature-Based Teeth Recognition system—2011—IEEE (Year: 2011).*

* cited by examiner

COMPUTER-IMPLEMENTED METHOD AND SYSTEM FOR PREDICTING ORTHODONTIC RESULTS BASED ON LANDMARK DETECTION

TECHNICAL FIELD

The present invention relates to the field of deep learning and image processing technologies, and in particular, to a computer-implemented method and system for predicting orthodontic results based on landmark detection.

BACKGROUND

The description in this section merely provides background information related to the present invention and does not necessarily constitute the prior art.

Orthodontics deals with the diagnosis, correction, and prevention of mal-positioned teeth and jaws. With the development of 3D printing technology and digital orthodontics, invisible aligners have been introduced into the field of orthodontics. The researches show that there are many invisible aligner service providers oriented to orthodontists. In most cases, the orthodontist serves as a communication window between the service provider and the patient. Generally, an orthodontist designs an orthodontic treatment plan for a patient and uploads data of the patient; a technician performs operations based on the data to predict a post-treatment teeth model as a target position and design an orthodontic treatment process from the original position to the target position, and then feeds back the designed process to the orthodontist. After the designed process is approved by the orthodontist, invisible aligners to be used in the orthodontic treatment process are fabricated. In the above process, the orthodontist still plays a very important role. The effect and efficiency of the orthodontic treatment plan relies greatly on the orthodontist's experience in designing orthodontic treatment plans.

With the rapid development of computer hardware and machine learning algorithms, data-driven approaches for medical image processing based on machine learning have gradually become the focus of research. The medical imaging in the dental field mainly involves facial CBCT data, intraoral scanning data, panoramic radiographs, lateral cephalometric radiographs, and the like. An experienced orthodontist can determine the condition of a patient based on these data and design a feasible and efficient orthodontic treatment plan.

However, the diagnosis process relies greatly on the experience of the orthodontist and is highly influenced by subjective factors. To solve this problem, numerous methods for analysis and diagnosis based on deep learning using existing data and labels have been developed. Limited by the dependence of deep learning methods on data sets, the alignment of medical data acquired by different medical devices and the privacy of medical data pose higher requirements on the robustness of the deep learning algorithm, i.e., the algorithm needs to be highly robust in order to produce better results under different data sets. Therefore, the direct application of deep learning for orthodontic prediction is still very challenging.

A 3D teeth model alone is not enough for orthodontics. In conventional methods for automated generation of orthodontic treatment plans, input data is directly processed and outputted end-to-end, which lacks interpretability and reliability, making it even difficult for an orthodontist to determine whether the generated orthodontic treatment plan is correct.

SUMMARY

To resolve the above problems, the present invention provides a computer-implemented method and system for predicting orthodontic results based on landmark detection. A crown point cloud and the tooth point clouds with labels are acquired based on a pre-treatment dentition model; global dentition features and local tooth features are extracted; feature fusion is performed on the global dentition features and the local tooth features to obtain landmarks of individual teeth; dentition attention features with the landmarks are acquired based on an attention mechanism, and then rigid transformation parameters are acquired, to predict a post-treatment crown model at a target position.

In order to realize the above objective, the present invention adopts the following technical solutions:

According to a first aspect, the present invention provides a computer-implemented method for predicting orthodontic results based on landmark detection, including:

acquiring a crown point cloud, a set of tooth point clouds, and corresponding tooth labels at an original position according to a dentition model using a processor;

extracting global dentition features and local tooth features respectively according to the crown point cloud and the tooth point clouds using the processor, and storing the global dentition features and the local tooth features in an internal memory;

performing feature fusion on the global dentition features, tooth labels of individual teeth, and the local tooth features of the individual teeth using the processor to obtain fused features of the individual teeth, and extracting landmarks of the individual teeth according to the fused features of the individual teeth and offset vectors from points in the tooth point clouds to the landmarks using the processor;

fusing the landmarks of the individual teeth and the tooth point clouds, extracting tooth attention features using the processor, acquiring dentition attention features with the landmarks according to the tooth attention features using the processor, and fusing the dentition attention features with the global dentition features and the local tooth features that are stored in the internal memory using the processor to obtain a point cloud with fused landmarks; and acquiring pre- and post-treatment rigid transformation parameters according to the point cloud with the fused landmarks and a crown point cloud at a target position using the processor, and obtaining a post-treatment crown model prediction result according to the rigid transformation parameters and the crown point cloud at the original position to be treated using the processor.

In an optional implementation, the process of extracting global dentition features and local tooth features includes: extracting global dentition features and local tooth features respectively according to the crown point cloud and the tooth point clouds through a shared multilayer perceptron including three convolutional layers, three normalization layers, three activation layers, one max pooling layer, and one convolutional layer.

In an optional implementation, the process of extracting landmarks of the individual teeth includes: processing the fused features of the individual teeth through a fully connected layer to obtain offset vectors from the points in the tooth point clouds to landmarks corresponding to the fully connected layer, wherein the fully connected layer includes three convolutional layers, two normalization layers, and two activation layers; and adding the offset vectors to coordinates of the points in the tooth point clouds to obtain voting values of the points with respect to the landmarks, and performing average pooling on the voting values of all the points to obtain coordinates of the landmarks.

In an optional implementation, the process of extracting tooth attention features includes: mapping tooth features obtained from the fusion of the landmarks of the individual teeth and the tooth point clouds into three tensors through three convolutional layers, performing a matrix multiplication operation on two of the tensors to calculate point-wise attention and channel-wise attention, multiplying the point-wise attention by the other tensor, multiplying the channel-wise attention by the other tensor, and adding products of the two multiplications to obtain the tooth attention features.

In an optional implementation, the process of extracting dentition attention features includes: concatenating tooth attention features of all teeth, mapping the concatenated tooth attention features into three tensors through three convolutional layers, performing a matrix multiplication operation on two of the tensors to obtain a similarity matrix, and multiplying the similarity matrix by the other tensor to obtain the dentition attention features.

In an optional implementation, the rigid transformation parameters are obtained according to the point cloud with the fused landmarks through a fully connected layer, where the fully connected layer includes two convolutional layers, two normalization layers and two activation layers, and features outputted by the activation layers are processed by a max pooling layer, one convolutional layer, two normalization layers, and another convolutional layer to obtain the rigid transformation parameters.

In an optional implementation, the method further includes normalizing the obtained dentition model, and registering the crown point clouds at the original position and the target position; and downsampling every tooth by farthest point sampling to obtain the tooth point clouds.

According to a second aspect, the present invention provides a computer-implemented system for predicting orthodontic results based on landmark detection, including:
  a data acquisition module, configured to acquire a crown point cloud, a set of tooth point clouds, and corresponding tooth labels at an original position according to a dentition model using a processor;
  a landmark extraction module, configured to extract global dentition features and local tooth features respectively according to the crown point cloud and the tooth point clouds using the processor, and store the global dentition features and the local tooth features in an internal memory; and
  perform feature fusion on the global dentition features, tooth labels of individual teeth, and the local tooth features of the individual teeth using the processor to obtain fused features of the individual teeth, and extract landmarks of the individual teeth according to the fused features of the individual teeth and offset vectors from points in the tooth point clouds to the landmarks using the processor;
  an attention extraction module, configured to fuse the landmarks of the individual teeth and the tooth point clouds, extract tooth attention features using the processor, acquire dentition attention features with the landmarks according to the tooth attention features using the processor, and fuse the dentition attention features with the global dentition features and the local tooth features that are stored in the internal memory using the processor to obtain a point cloud with fused landmarks; and
  a rigid transformation parameter regression module, configured to acquire pre- and post-treatment rigid transformation parameters according to the point cloud with the fused landmarks and a crown point cloud at a target position using the processor, and obtain a post-treatment crown model prediction result according to the rigid transformation parameters and the crown point cloud at the original position to be treated using the processor.

According to a third aspect, the present invention provides an electronic device, including a memory, a processor and a computer instruction stored on the memory and executed on the processor, the computer instruction, when executed by the processor, causing the implementation of the method according to the first aspect.

According to a fourth aspect, the present invention provides a computer-readable storage medium, configured to store a computer instruction, the computer instruction, when executed by a processor, causing the implementation of the method according to the first aspect.

Compared with the related art, the present invention has the following beneficial effects.

The present invention provides a computer-implemented method and system for predicting orthodontic results based on landmark detection. More tooth features are extracted, that is, landmarks on crowns, to obtain tooth feature information that can guide the orthodontic process more explicitly as part of numerical evaluation indicators of orthodontic results, which plays an important guiding role in the formulation of an orthodontic treatment plan.

The present invention provides a computer-implemented method and system for predicting orthodontic results based on landmark detection. A crown point cloud and the tooth point clouds with labels are acquired based on a pre-treatment dentition model; global dentition features and local tooth features are extracted respectively; feature fusion is performed on the global dentition features and the local tooth features to obtain landmarks of individual teeth; after the landmarks are extracted, dentition attention features with the landmarks are acquired based on an attention mechanism, and then rigid transformation parameters are acquired, to predict a post-treatment crown model at a target position. According to the prediction of orthodontic results based on landmarks, the rigid motion changes of teeth during an orthodontic treatment, and the characteristics of mal-occlusion dentition and normal dentition and differences therebetween are more effectively learned.

The advantages of additional aspects of the present invention will be provided in the following description, some of which will become apparent from the following description or may be learned from practices of the present invention.

BRIEF DESCRIPTION OF THE DRAWINGS

The accompanying drawings that constitute a part of the present invention are used to provide a further understanding of the present invention. Exemplary embodiments of the present invention and descriptions of the embodiments are used to explain the present invention, and do not constitute any inappropriate limitation to the present invention.

DETAILED DESCRIPTION

The present invention is further described below with reference to the accompanying drawings and embodiments.

It should be noted that, the following detailed descriptions are all exemplary, and are intended to provide further descriptions of the present invention. Unless otherwise specified, all technical and scientific terms used herein have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular forms are intended to include the plural forms as well, unless the context clearly indicates otherwise. Moreover, it should be understood that the terms "include", "have" and any other variants mean to cover the non-exclusive inclusion, for example, a process, method, system, product, or device that includes a list of steps or units is not necessarily limited to those units, but may include other units not expressly listed or inherent to such a process, method, product, or device.

The embodiments in the present invention and features in the embodiments may be mutually combined in a case that no conflict occurs.

Embodiment 1

Figure 1:
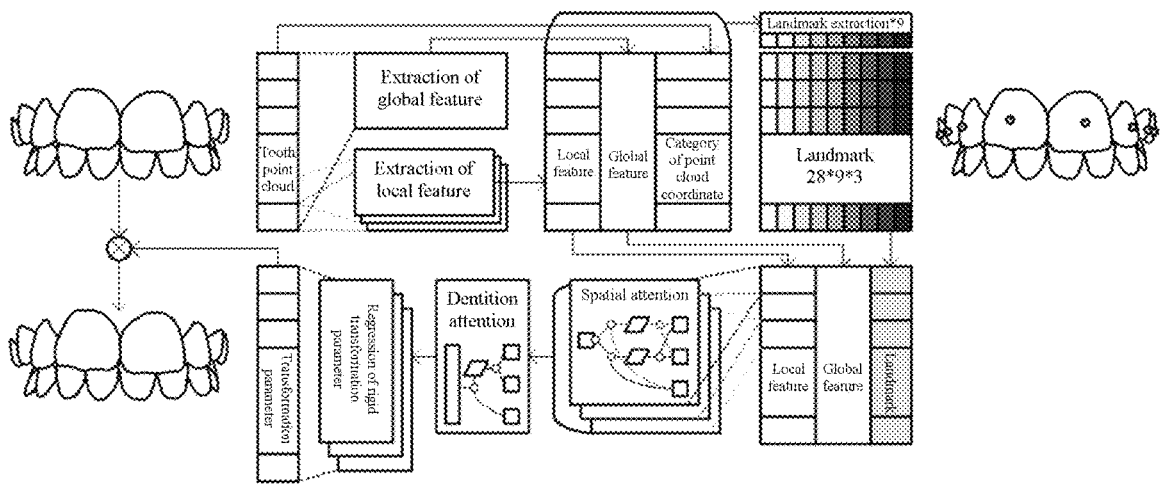
FIG. 1 is a schematic diagram of a computer-implemented method for predicting orthodontic results based on landmark detection according to Embodiment 1 of the present invention.

As shown in FIG. 1, this embodiment provides a computer-implemented method for predicting orthodontic results based on landmark detection, including the following steps:

S1: Acquire a crown point cloud, a set of tooth point clouds, and corresponding tooth labels at an original position according to a dentition model using a processor.

S2: Extract global dentition features and local tooth features respectively according to the crown point cloud and the tooth point clouds using the processor, and store the global dentition features and the local tooth features in an internal memory; and perform feature fusion on the global dentition features, tooth labels of individual teeth, and the local tooth features of the individual teeth using the processor to obtain fused features of the individual teeth, and extract landmarks of the individual teeth according to the fused features of the individual teeth and offset vectors from points in the tooth point clouds to the landmarks using the processor.

S3: Fuse the landmarks of the individual teeth and the tooth point clouds, extract tooth attention features using the processor, acquire dentition attention features with the landmarks according to the tooth attention features using the processor, and fuse the dentition attention features with the global dentition features and the local tooth features that are stored in the internal memory using the processor to obtain a point cloud with fused landmarks.

S4: Acquire pre- and post-treatment rigid transformation parameters according to the point cloud with the fused landmarks and a crown point cloud at a target position using the processor, and obtain a post-treatment crown model prediction result according to the rigid transformation parameters and the crown point cloud at the original position to be treated using the processor.

In this embodiment, in step S1, the dentition model is obtained based on pre- and post-treatment intraoral scanning data or occlusal scanning model from a reverse mold, and the crown point cloud, the tooth point clouds of individual teeth, and the corresponding tooth labels at an original position and a target position before and after the orthodontic treatment are obtained according to the dentition model.

Specifically, 1.1. a 3D mesh model of dentition is obtained by using an intraoral scanner or plaster for a reverse mold of occlusal scanning, the dentition model is segmented by deep learning or manual labeling, and all teeth are classified.

A dentition model obtained from plaster for a reverse mold of occlusal scanning is used as an example. A file of the model is in off format. Normal data of vertexes is calculated according to a topological connection relationship of the vertexes, and the vertexes are selected as the required point cloud and stored in the format of <x,y,z,N_x, N_y,N_z>. The point cloud is inputted into a segmentation and classification network constructed based on deep learning to obtain a crown point cloud and corresponding tooth labels.

In this embodiment, the segmentation is carried out by 3D tooth segmentation and labeling using deep convolutional neural networks. The point cloud is segmented into 29 categories, including a non-tooth point cloud and 28 tooth point clouds.

Figure 2:
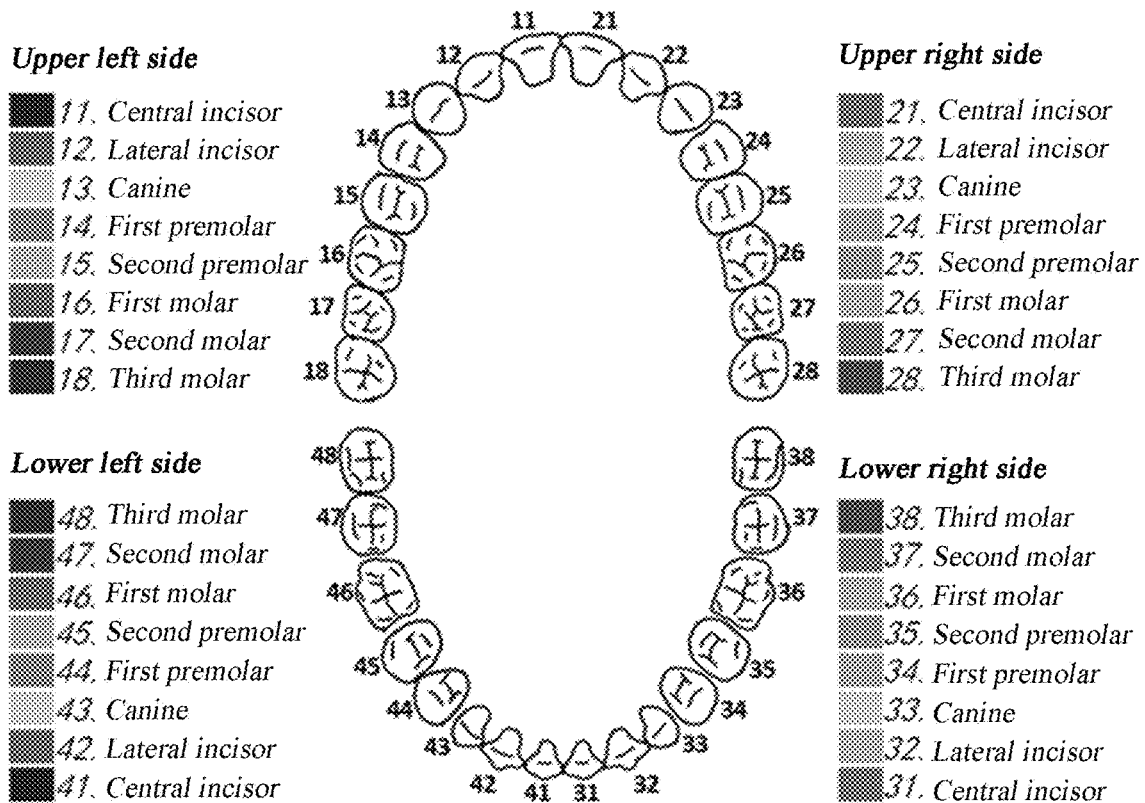
FIG. 2 is a schematic diagram of tooth categories and corresponding labels according to Embodiment 1 of the present invention.
Figures 3A, 3B, 3C, 3D:
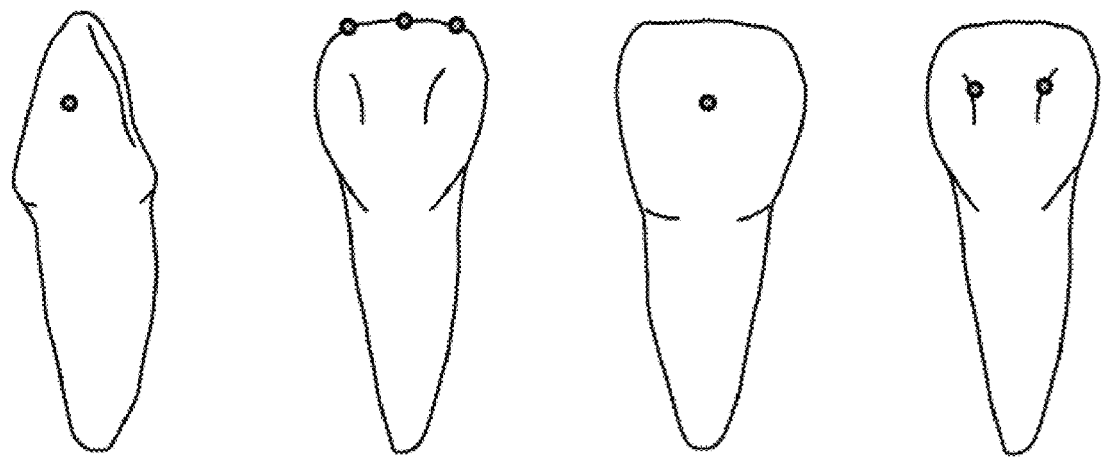
FIG. 3(*a*) to FIG. 3(*d*) are schematic diagrams of tooth landmarks CO, CU, FA and OC respectively according to Embodiment 1 of the present invention.

As shown in FIG. 2, the tooth point clouds are divided into four groups according to tooth numbers as labels, including: upper right teeth 11-17, upper left teeth 21-27, lower right teeth 31-37, and lower left teeth 41-47. In each group of teeth, number 1 represents an incisor, number 2 represents a lateral incisor, number 3 represents a canine, numbers 4 and 5 represent first and second premolars respectively, numbers 6 and 7 represent first and second molars respectively; wisdom teeth are not considered.

In this embodiment, a pre-treatment dentition model and a post-treatment dentition model in the same medical case are used as data of an original position and data of a target position respectively; the data of the original position is used as an input of the segmentation and classification network, and the data of the target position is used as supervision data to supervise training of the segmentation and classification network.

In this embodiment, a dentition model may alternatively be obtained by using an intraoral scanner under the similar processing.

1.2. Position coordinates of the dentition model are normalized to an origin of coordinates, and the complete dentition point clouds at the original position and the target position are registered, so that the pre- and post-treatment crowns are substantially on the same plane. This operation is to reduce the error caused by different scanning angles of the pre- and post-treatment models, so that the model can better learn the real movement of teeth.

In this embodiment, the dentition point clouds are registered by using an iterative closest point (ICP) algorithm, specifically including: calculating a distance between points in two point clouds respectively, and calculating a closest point pair by using a greedy algorithm, to obtain a correspondence between points in the point clouds; solving parameters in rigid transformation by using the method of least squares according to the correspondence between points in the two point clouds, and moving a source point cloud; and repeating the above two steps for iterative calculation until convergence.

In some cases, the numbers of pre- and post-treatment teeth are not equal due to tooth extraction, so the tooth with poor segmentation results is deleted, and the tooth with an original position and a target position that do not correspond to each other is deleted. In order to keep the network input consistent, the deleted teeth or missing teeth are replaced with the origin of coordinates. In this embodiment, a total of 28 teeth are labeled.

In this embodiment, by farthest point sampling (FPS), each tooth point cloud is downsampled to 400 points as an input of the network, reducing the data volume inputted to the network, and finally the number of points in the point clouds inputted to the network is 11200 (28*400).

The FPS is carried out as follows. A point on the surface of the model is randomly selected as a starting point. A distance from each of all other points to this point is calculated. A point with the farthest distance is selected. A distance from each of all other points to this point is calculated. A point with the farthest distance from both two points is selected, until the required number of points is satisfied. Compared with random sampling, by the farthest point sampling, a larger sampling region and the capacity to generalize point clouds can be obtained.

In this embodiment, the data to be calibrated or calculated includes: nine landmarks of each tooth; and rigid transformation parameters of each tooth from the original position to the target position during an orthodontic treatment.

Different tooth anatomical landmarks have different effects during the orthodontic treatment: a contact point (CO) is a point where two adjacent teeth are in contact, reflecting whether the adjacent teeth are arranged correctly; an occlusal point (OC) is a concave point on a crown that is in contact with a corresponding occlusal tooth, reflecting whether an occlusal state is normal; a facial-axis point (FA) is a center point on the surface of a tooth near the lip, reflecting an orientation of a tooth, or the FA can be used as a force application point for the placement of attachments during an orthodontic treatment; and a cusp point (CU) is a point where the tip of a tooth touches food, also reflecting an orientation of a tooth or whether an occlusal state is normal. Therefore, in this embodiment, nine landmarks of each tooth include two OCs, two COs, one FA, and four CUs, as shown in FIG. 3(a) to FIG. 3(d).

The rigid transformation parameters from the original position to the target position are calculated by the ICP algorithm. The ICP algorithm is essentially an optimal registration method based on the method of least squares. By this algorithm, the selection of a point pair with a correspondence is repeated to calculate optimal rigid transformation, until the convergence accuracy requirements for correct registration are satisfied. The objective of the ICP algorithm is to find a rotation parameter R and a translation parameter T between point clouds at the original position and the target position to satisfy optimal matching between data of two points under a certain metric, so as to obtain the rigid transformation parameters of individual teeth during an orthodontic treatment of the dentition from deformity to neatness.

If the rotation parameter matrix R and the translation parameter T obtained by the ICP algorithm are directly used as supervision information to train a neural network, the degree of freedom is too high and the actual movement of the teeth cannot be well characterized. Therefore, this embodiment adopts a more convenient and direct method to characterize the movement of the teeth, that is, to define a six-dimensional vector $<r_x,r_y,r_z,T_x,T_y,T_z>$ for each tooth. The first three parameters $<r_x,r_y,r_z>$ represent the tooth rotation parameter r obtained by axis-angle representation and can be converted into a rotation matrix R. The last three parameters represent the translation of the center point of the tooth, expressed as a translation vector $T_{of}$. In particular, tooth rotation is a rotation process with the center point C of the tooth as a rotation point, then the movement from the point cloud at the original position $P_{ori}$ to the point cloud at the target position $P_{new}$ may be represented as:

$$P_{new}=R\cdot(P_{ori}-C)+T_{of}+C.$$

In this embodiment, random rotation and translation operations are performed on an inputted tooth at a certain probability, and the supervision information is updated, to increase the data volume, so as to achieve data enhancement and increase robustness.

Specifically, in this embodiment, it is set that each tooth has a probability of 0.3 for random rotation and translation. The rotation is performed in a random axial direction at an angle of +90°. The translation is performed in a random direction with a distance of ±0.5 mm. The movement of the teeth defined in this embodiment is similar to the data enhancement method, so the update of the supervision information only needs multiply the rotation matrices and add the translation vectors respectively.

In step S2, according to the obtained crown point cloud, the global dentition features are extracted by using the PointnetEncoder structure, and the local tooth features are extracted according to the tooth point clouds of individual teeth. After feature fusion is performed on the global dentition features and the local tooth features, the offset vectors between the points in the tooth point clouds of the individual teeth and the landmarks are obtained by the PointNet regression, and then all points in the individual teeth are voted by average pooling to obtain landmarks corresponding to the individual teeth.

Specifically, 2.1. the global dentition features are extracted by using the PointnetEncoder structure. The crown point cloud is subjected to a shared multilayer perceptron with three layers implemented by 1d convolution and to a max pooling layer to extract the global dentition features.

Figure 4:
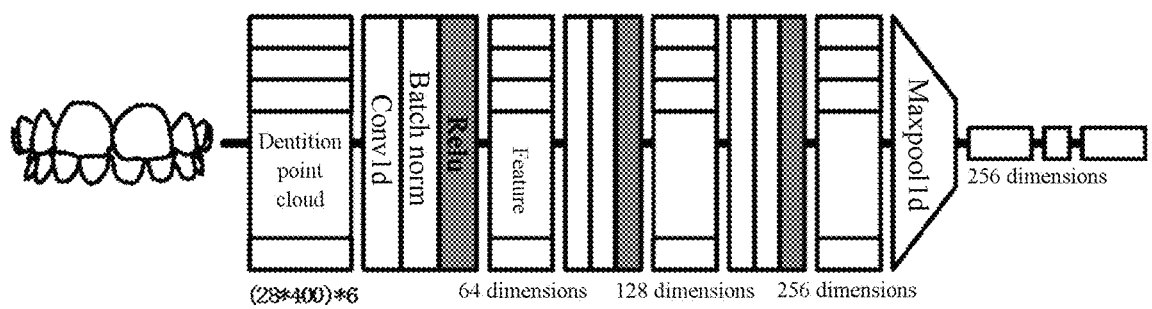
FIG. 4 is a schematic diagram of extraction of global dentition features according to Embodiment 1 of the present invention.

The idea of the PointnetEncoder structure comes from the paper PointNet: Deep Learning on Point Sets for 3D Classification and Segmentation. In this embodiment, three layers of Conv1d, three layers of BatchNorm1d, and three layers of ReLU are used as the sharedMLP. Feature extraction is performed on data of all crown point clouds (28*400=11200 points) in 6 channels <x,y,z,$N_x$,$N_y$,$N_z$> by using the sharedMLP, and the dimension is increased to 256. Calculation is performed through one layer of MaxPool1d and one layer of Conv1d to obtain one 256-dimensional vector as the global dentition features, as shown in FIG. 4.

The feature extraction is performed on the point cloud by MaxPool1d of PointNet, mainly for the disordered characteristics of point cloud data. Due to the disordered characteristics of the point cloud, the model that needs to process point clouds should have permutation invariance. That is to say, even if the order of the input data points is different, but the input is the same point cloud, the output of the model should be the same. Therefore, 1d convolution (fully connected layer) of PointNet is selected for feature extraction at each point, because the fully connected layer will perform the same calculation on all points, and then the output is obtained by MaxPool. In this way, the problem of permutation invariance of input required by the deep learning network of point clouds can be resolved.

2.2. The local tooth features are extracted by PointnetEncoder. The tooth point clouds of the individual teeth are subjected to an independent multilayer perceptron implemented by three layers of 1d convolution and a max pooling layer to extract the local tooth features of the individual teeth.

Figure 5:
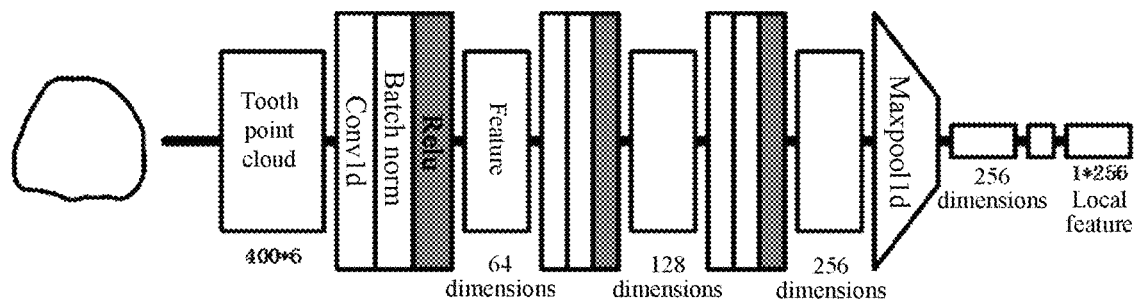
FIG. 5 is a schematic diagram of extraction of local tooth features according to Embodiment 1 of the present invention.

This process is similar to the extraction of the global dentition features. The difference is that the extraction of the local tooth features is performed by using 28 independent sharedMLPs to perform feature extraction on 400 points of each tooth. Feature extraction is performed on input data of the tooth point clouds in 6 channels, and the dimension is increased to 256, to finally obtain 28 256-dimensional vectors as the local tooth features, as shown in FIG. 5.

2.3. The (28-dimensional) OneHot vector of the tooth labels of each tooth, the (256-dimensional) global dentition features and the (256-dimensional) local tooth features of the tooth are concatenated and copied for 400 times, and then concatenated with the coordinates of 400 points of the tooth point clouds, to obtain the fused feature point cloud (400*543) of the tooth.

Figure 6:
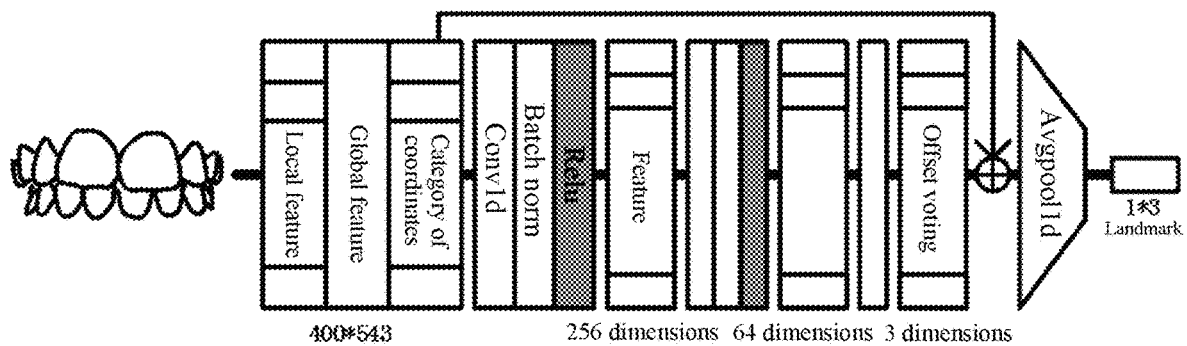
FIG. 6 is a schematic diagram of extraction of landmarks according to Embodiment 1 of the present invention.

After the features are repeated and fused, the offset vector between each point and each landmark is obtained by using the fully connected layer. In this embodiment, nine landmarks of each tooth are calculated by using nine fully connected layers with the same structure but independent of each other. As shown in FIG. 6, specifically, each fully connected layer consists of three layers of Conv1d, two layers of BatchNorm1d and two layers of ReLU for calculation to obtain an offset vector matrix (400*3), representing an offset vector from each point in each tooth point cloud to a corresponding landmark in the fully connected layer.

2.4. The offset vector is added to the coordinates of the point to obtain a voting value of the point for a certain landmark, and average pooling is performed on coordinates obtained from voting values of all points to predict coordinates of the landmark.

In this embodiment, the offset vector (400*3) is added to the coordinates (400*3) of the point cloud to obtain a voting value of each point for the current landmark, and average pooling AvgPool1d is performed on 400 possible coordinates to obtain coordinates of the landmark. In the above process, nine landmarks of each tooth in 28 teeth are obtained, a total of 252 points. This process can be represented as:

$$\text{lm}^{t,k} = \frac{1}{N}\sum_{i=1}^{N}\left(p_i^t + of_i^{t,k}\right)$$

$\text{lm}^{t,k}$ represents a landmark with a number of t and a tooth number of k, N is the quantity of points in a point cloud of each tooth, and $of_i^{t,k}$ represents an offset vector between each point and a corresponding landmark calculated by the fully connected layer.

In this embodiment, the used supervision data is a labeled landmark. A loss function adopts L1loss of each landmark, which can be represented as:

$$L_{Landmark-pre} = \sum_{t=1}^{T}\sum_{k=1}^{K}\|\text{lm}^{t,k} - \text{lm}_{gt}^{t,k}\|_1$$

T is the quantity of teeth included in the dentition, K is the quantity of used landmarks, and $L_{Landmark-pre}$ represents direct supervision to the tooth landmarks to ensure that the landmarks are distributed correctly.

In step S3, the attention features of the teeth and dentition are extracted by using a separable self-attention (SSA) mechanism, and the attention features and the obtained landmarks are fused again.

By using the post-treatment crown point cloud at the target position as the supervision information, the fused features are inputted to the fully connected layer to obtain the rigid transformation parameters of the individual teeth from the original position to the target position. The rigid transformation parameters are converted into rigid transformation and multiplied by the crown point cloud at the original position to obtain the predicted post-treatment crown model at the target position.

The idea of the separable self-attention mechanism comes from the paper SSAN: Separable Self-Attention Network for Video Representation Learning.

Figure 7A:
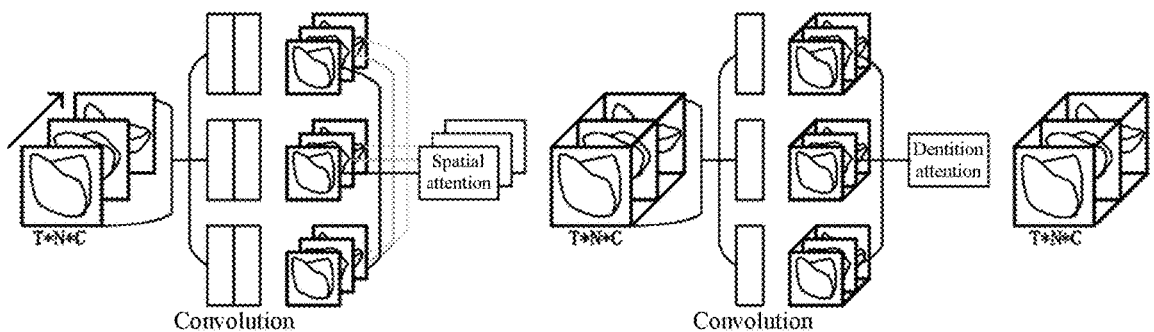
FIG. 7(*a*) to FIG. 7(*c*) are schematic diagrams of a separable self-attention mechanism, a spatial attention mechanism, and a dentition attention mechanism respectively according to Embodiment 1 of the present invention.
Figure 7B:
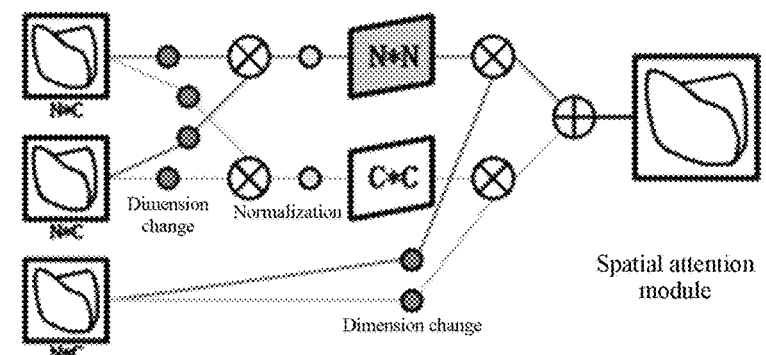
Figure 7C:
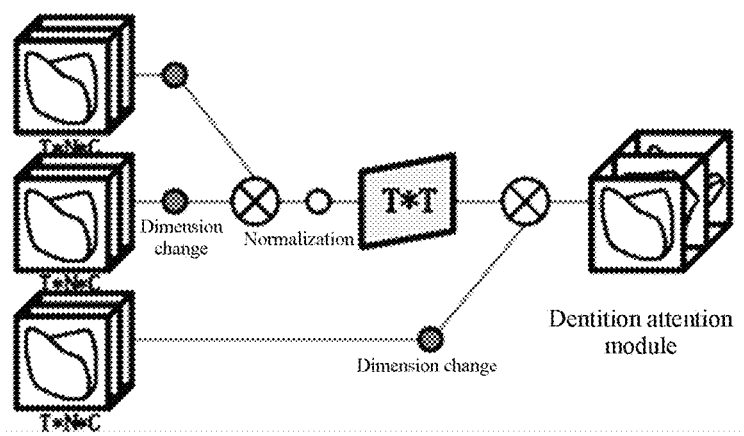

As shown in FIG. 7(*a*) to FIG. 7(*c*), specifically, 3.1. by using the separable self-attention mechanism, feature propagation and fusion of the point cloud of the individual teeth and its feature are performed, including channel-wise self attention and point-wise self attention. The tooth attention features are extracted according to the channel-wise self attention and the point-wise self attention.

Let $X \in \mathbb{R}^{T \times K \times C}$ be an input feature. T is the quantity of teeth included in the dentition, K is the quantity of used landmarks, and C is a feature channel involved in the calculation. In this embodiment, X is obtained by fusion of the landmark and the tooth point cloud feature, T is 28, K is 10 (including 9 landmarks and a tooth center point), and C is 256.

The commonly used Attention block can map X into three matrices query, key and value, attention distribution (similarity) is calculated through multiplication, and a weighted value of input information is calculated according to the attention distribution. This embodiment adopts spatial attention, first considers the feature information $X^t$ of each tooth, and calculates the point-wise attention and the channel-wise attention.

$X^t$ is inputted to three Conv1d to be mapped into three tensors $X_q^t$, $X_k^t$ and $X_v^t$, and similarity matrices $M_S \in \mathbb{R}^{K \times K}$ and $M_C \in \mathbb{R}^{C \times C}$ are calculated through a matrix multiplication operation to respectively represent the point-wise attention and the channel-wise attention. Then, the channel-wise attention is multiplied by the channel-wise value, the point-wise attention is multiplied by the point-wise value, and the products are added to obtain the attention features of the current tooth t. The calculation is as follows:

$$M_S = X_{q(S)}^t \times X_{k(S)}^t$$

$$M_C = X_{q(C)}^t \times X_{k(C)}^t$$

$$\hat{X}^t = (M_S \times X_{v(S)}^t + (M_C \times X_{v(C)}^t)$$

3.2. The dentition attention features are extracted by TeethAttention.

The tooth attention features are concatenated to obtain $\hat{X} = \text{Cat}[\hat{X}^1, \hat{X}^2, \ldots, \hat{X}^T]$, $\hat{X} \in \mathbb{R}^{T \times K \times C}$. Similar to the above process, $\hat{X}$ is inputted to three Conv1d to be mapped into three tensors $\hat{X}_q$, $\hat{X}_k$ and $\hat{X}_v$, and a similarity matrix $M_T \in \mathbb{R}^{T \times T}$ is calculated through matrix multiplication to represent the attention of each tooth, and then multiplied by value to obtain the dentition attention features. The calculation is as follows:

$$M_T = \hat{X}_q \times \hat{X}_k$$

$$Y = M_T \times \hat{X}_v$$

$Y \in \mathbb{R}^{T \times K \times C}$ is the dentition attention features with landmarks and dentition information.

In this embodiment, the selected self-attention mechanism only uses landmarks and their features, not all tooth point clouds. The reason is that the training of the deep learning model is more dependent on the performance of computing hardware and takes up a lot of computing space. If 11200 point clouds of all crowns are still used, the storage will take up a lot and it will be very difficult to converge during network training. Therefore, the selection of landmarks of only 280 points as the input of the point-wise self-attention module can greatly reduce the amount of parameters and increase the convergence speed of network training and test calculation speed.

3.3. The (28-dimensional) OneHot vector of the tooth labels of each tooth, the (256-dimensional) global dentition features and the (256-dimensional) local tooth features of the tooth are concatenated and copied for 10 times, and then concatenated with the coordinates of 10 points of the tooth landmarks and the (256-dimensional) dentition attention features, to obtain the fused feature point cloud (10*799) of the tooth.

In step S4, a 6-dimensional rigid transformation parameter RTvector=<$r_x,r_y,r_z,T_x,T_y,T_z$> of each tooth is calculated by using 28 fully connected layers with the same structure but independent of each other. Specifically, each fully connected layer consists of two layers of Conv1d, two layers of BatchNorm1d, two layers of ReLU, a layer of MaxPool1d, a layer of Conv1d, two layers of BatchNorm1d, and the last layer of Conv1d. Finally, through calculation, a rigid transformation parameter matrix (28*6) is obtained.

Figure 8:
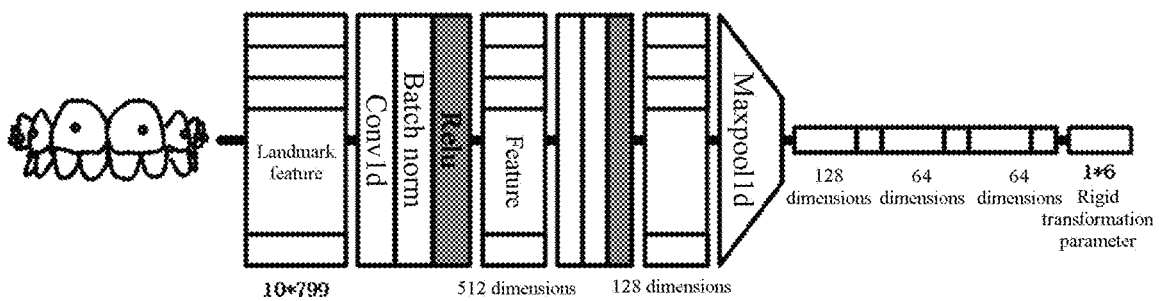
FIG. 8 is a schematic diagram of regression of rigid transformation parameters according to Embodiment 1 of the present invention.

In this embodiment, after feature fusion, the rigid transformation parameters during the orthodontic treatment are obtained through regression by using an independent multilayer perceptron for individual teeth, as shown in FIG. 8. The tooth rigid transformation matrix is calculated according to the rigid transformation parameters, and multiplied by the coordinates of the crown point cloud at the original position, to obtain the predicted post-treatment crown point cloud model at the target position.

The output of the neural network is RTvector=<$r_x,r_y,r_z,T_x,T_y,T_z$>. <$T_x,T_y,T_z$> represents the offset $T_{of}$ from the center point of the tooth, <$r_x,r_y,r_z$> represents the rotation axis angle parameter r about its center point, and the corresponding rotation matrix R is calculated as follows:

$$r_x = \begin{bmatrix} 0 & -r_z & r_y \\ r_z & 0 & -r_x \\ -r_y & r_x & 0 \end{bmatrix}$$

$$R = I + \sin\theta r_x + (1 - \cos\theta) r_x^2$$

In this embodiment, the point cloud $P^t$ corresponding to each tooth t is calculated to obtain the corresponding point cloud $\hat{P}^t$ at the target position:

$$\hat{P}^t = \{R^t \cdot (p_i - C^t) + T_{of}^t + C^t | p_i \in P^t\}.$$

In this embodiment, the selection of loss function is to enable the network to better learn the distribution of the orthodontic crown model at the target position. The loss function includes: the chamfer distance between the predicted point cloud at the target position and the point cloud at the target position in supervision data, the predicted chamfer vector smoothL1loss between adjacent tooth point clouds at the target position, L2loss of the rigid transformation parameters, and L1loss of each landmark obtained through rigid transformation.

The loss function may be changed according to the actual situation.

(1) $L_{chamfer-distance}$ is the chamfer distance between the predicted point cloud of each tooth and the point cloud in the supervision data, which can effectively supervise the similarity and accuracy of the prediction of the target position of each tooth during an orthodontic treatment:

$$L_{chamfer-distance}(\hat{P}^t, P_{gt}^t) = \sum_{p \in \hat{P}^t} \min_{q \in P_{gt}^t} d(p,q) + \sum_{p \in P_{gt}^t} \min_{q \in \hat{P}^t} d(p,q).$$

d(p,q) represents a Euclidean distance between point p and point q.

(2) $L_{connection}$ is the predicted chamfer vector smoothL1loss between adjacent tooth point clouds, which focuses on whether the connection between adjacent teeth is correct. Specifically, the adjacent point clouds include tooth point clouds on the left and right sides of a certain tooth point cloud, upper tooth point clouds and lower tooth point clouds.

$$L_{connection}(\hat{P}, P_{gt}) = \sum_{P^t \in \hat{P}} \sum_{P^{co} \in \mathcal{P}(P^t)} \|V(P^t, P^{co}) - V(P_{gt}^t, P_{gt}^{co})\|_S;$$

$$V(P^1, P^2) = \bigcup_{1 \leq i,j \leq 2}^{i \neq j} \{x - y | y^* = \arg\min_{y \in P^j} \|x - y\|_2, x \in P^i\}.$$

$V(P^1, P^2)$ represents a nearest-neighbor interpolation vector between point clouds $P^1$ and $P^2$, and $\mathcal{P}(P^t)$ represents a set of tooth point clouds connected to the tooth t.

(3) $L_{vector}$ is L2loss of the rigid transformation parameters, which is a direct constraint on the rigid transformation parameters:

$$L_{vector} = \lambda_r \sum_{t=1}^{T} \|r^t - r_{gt}^t\|_2 + \lambda_{T_{of}} \sum_{t=1}^{T} \|T_{of}^t - T_{ofgt}^t\|_2$$

In this embodiment, $\lambda_r = 10$, $\lambda_{T_{of}} = 1$.

(4) $L_{Landmark-new}$ is L1loss of the landmark at the position after the orthodontic treatment, which can not only supervise the distribution of landmarks, but also have certain constraints on the learning of rigid transformation parameters.

$$L_{Landmark-new} = \sum_{t=1}^{T}\sum_{k=1}^{K}\left\|\mathcal{T}^t(\mathrm{lm}^{t,k}) - \mathcal{T}_{gt}^t(\mathrm{lm}_{gt}^{t,k})\right\|_1$$

$\mathcal{T}^t(P)$ represents the rigid transformation of the point set P corresponding to t.

Embodiment 2

This embodiment provides a computer-implemented system for predicting orthodontic results based on landmark detection, including:

a data acquisition module, configured to acquire a crown point cloud, a set of tooth point clouds, and corresponding tooth labels at an original position according to a dentition model using a processor;

a landmark extraction module, configured to extract global dentition features and local tooth features respectively according to the crown point cloud and the tooth point clouds using the processor, and store the global dentition features and the local tooth features in an internal memory; and perform feature fusion on the global dentition features, tooth labels of individual teeth, and the local tooth features of the individual teeth using the processor to obtain fused features of the individual teeth, and extract landmarks of the individual teeth according to the fused features of the individual teeth and offset vectors from points in the tooth point clouds to the landmarks using the processor;

an attention extraction module, configured to fuse the landmarks of the individual teeth and the tooth point clouds, extract tooth attention features using the processor, acquire dentition attention features with the landmarks according to the tooth attention features using the processor, and fuse the dentition attention features with the global dentition features and the local tooth features that are stored in the internal memory using the processor to obtain a point cloud with fused landmarks; and a rigid transformation parameter regression module, configured to acquire pre- and post-treatment rigid transformation parameters according to the point cloud with the fused landmarks and a crown point cloud at a target position using the processor, and obtain a post-treatment crown model prediction result according to the rigid transformation parameters and the crown point cloud at the original position to be treated using the processor.

It is to be noted that, the above modules correspond to the steps in Embodiment 1, examples and application scenarios implemented by the above modules are the same as those implemented by the corresponding steps, but are not limited to content disclosed in Embodiment 1. It is to be noted that, the above modules, as part of the system, may be executed in, for example, a computer system having a set of computer executable instructions.

In more embodiments, an electronic device is further provided, including a memory, a processor and a computer instruction stored on the memory and executed on the processor, the computer instruction, when executed by the processor, causing the implementation of the method in Embodiment 1. For the sake of brevity, details are not repeated herein.

It should be understood that in this embodiment, the processor may be a central processing unit (CPU); or the processor may be another general-purpose processor, a digital signal processor (DSP), an application-specific integrated circuit (ASIC), a field programmable gate array (FPGA) or another programmable logical device, a discrete gate or a transistor logical device, a discrete hardware component, or the like. The general-purpose processor may be a microprocessor, or the processor may be any conventional processor and the like.

The memory may include a read-only memory and a random-access memory, and provide an instruction and data to the processor. A part of the memory may further include a non-volatile random-access memory. For example, the memory may further store device type information.

A dental chairside device, configured for acquisition, processing, segmentation and classification of an intraoral scanning model, analysis on occlusal state, detection of tooth landmarks, and prediction of an orthodontic target position, the dental chairside device including: an intraoral scanning optical recognition input device, a memory, a processor, a computer program stored on the memory and executable on the processor, and a pre- and post-treatment model visualization output device, the processor, when executing the program, implementing the method in Embodiment 1. For the sake of brevity, details are not repeated herein.

A computer-readable storage medium is provided, configured to store a computer instruction, the computer instruction, when executed by a processor, causing the implementation of the method in Embodiment 1.

The method in Embodiment 1 may be directly performed and completed by a hardware processor, or may be performed and completed by using a combination of hardware in the processor and a software module. The software module may be located in a mature storage medium in the field such as a random access memory, a flash memory, a read-only memory, a programmable read-only memory, an electrically erasable programmable memory, or a register. The storage medium is located in the memory. The processor reads information in the memory and completes the steps of the foregoing methods in combination with hardware thereof. To avoid repetition, details are not described herein.

A person of ordinary skill in the art may notice that the exemplary units and algorithm steps described with reference to this embodiment can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this application.

The specific implementations of the present invention are described above with reference to the accompanying drawings, but are not intended to limit the protection scope of the present invention. A person skilled in the art should understand that various modifications or transformations may be made without creative efforts based on the technical solutions of the present invention, and such modifications or transformations shall fall within the protection scope of the present invention.

What is claimed is:

1. A computer-implemented method for predicting orthodontic results based on landmark detection, comprising:
   acquiring a crown point cloud, a set of tooth point clouds, and corresponding tooth labels at an original position according to a dentition model using a processor;
   extracting global dentition features and local tooth features respectively according to the crown point cloud and the tooth point clouds using the processor, and storing the global dentition features and the local tooth features in an internal memory;
   performing feature fusion on the global dentition features, tooth labels of individual teeth, and the local tooth features of the individual teeth using the processor to obtain fused features of the individual teeth, and extracting landmarks of the individual teeth according to the fused features of the individual teeth and offset vectors from points in the tooth point clouds to the landmarks using the processor;
   fusing the landmarks of the individual teeth and the tooth point clouds, extracting tooth attention features using the processor, acquiring dentition attention features with the landmarks according to the tooth attention features, and fusing the dentition attention features with the global dentition features and the local tooth features that are stored in the internal memory using the processor to obtain a point cloud with fused landmarks; and
   acquiring pre- and post-treatment rigid transformation parameters according to the point cloud with the fused landmarks and a crown point cloud at a target position using the processor, and obtaining a post-treatment crown model prediction result according to the rigid transformation parameters and the crown point cloud at the original position to be treated using the processor, wherein
   the process of the extracting tooth attention features using the processor comprises:
      mapping tooth features obtained from the fusion of the landmarks of the individual teeth and the tooth point clouds into three tensors through three convolutional layers,
      performing a matrix multiplication operation on two of the tensors to calculate point-wise attention and channel-wise attention,
      multiplying the point-wise attention by the other tensor,
      multiplying the channel-wise attention by the other tensor, and
      adding products of the two multiplications to obtain the tooth attention features.

2. The computer-implemented method for predicting orthodontic results based on landmark detection according to claim 1, wherein the process of extracting global dentition features and local tooth features comprises: extracting global dentition features and local tooth features respectively according to the crown point cloud and the tooth point clouds through a shared multilayer perceptron comprising three convolutional layers, three normalization layers, three activation layers, one max pooling layer, and one convolutional layer.

3. The computer-implemented method for predicting orthodontic results based on landmark detection according to claim 1, wherein the process of extracting landmarks of the individual teeth comprises: processing the fused features of the individual teeth through a fully connected layer to obtain offset vectors from the points in the tooth point clouds to landmarks corresponding to the fully connected layer, wherein the fully connected layer comprises three convolutional layers, two normalization layers and two activation layers; and adding the offset vectors to coordinates of the points in the tooth point clouds to obtain voting values of the points with respect to the landmarks, and performing average pooling on the voting values of all the points to obtain coordinates of the landmarks.

4. The computer-implemented method for predicting orthodontic results based on landmark detection according to claim 1, wherein the process of acquiring dentition attention features with the landmarks according to the tooth attention features comprises: concatenating tooth attention features of all teeth, mapping the concatenated tooth attention features into three tensors through three convolutional layers, performing a matrix multiplication operation on two of the tensors to obtain a similarity matrix, and multiplying the similarity matrix by the other tensor to obtain the dentition attention features.

5. The computer-implemented method for predicting orthodontic results based on landmark detection according to claim 1, wherein the rigid transformation parameters are obtained according to the point cloud with the fused landmarks through a fully connected layer, wherein the fully connected layer comprises two convolutional layers, two normalization layers and two activation layers, and features outputted by the activation layers are processed by a max pooling layer, one convolutional layer, two normalization layers, and another convolutional layer to obtain the rigid transformation parameters.

6. The computer-implemented method for predicting orthodontic results based on landmark detection according to claim 1, comprising: normalizing the obtained dentition model, and registering the crown point clouds at the original position and the target position; and downsampling every tooth by farthest point sampling to obtain the tooth point clouds.

7. An electronic device, comprising a memory, a processor and a computer instruction stored on the memory and executed on the processor, the computer instruction, when executed by the processor, causing the implementation of the method according to claim 1.

8. A non-transitory computer-readable storage medium, configured to store a computer instruction, the computer instruction, when executed by a processor, causing the implementation of the method according to claim 1.

9. A computer-implemented system for predicting orthodontic results based on landmark detection, comprising:
   a data acquisition module, configured to acquire a crown point cloud, a set of tooth point clouds, and corresponding tooth labels at an original position according to a dentition model using a processor;
   a landmark extraction module, configured to extract global dentition features and local tooth features respectively according to the crown point cloud and the tooth point clouds using the processor, and store the global dentition features and the local tooth features in an internal memory; and
   perform feature fusion on the global dentition features, tooth labels of individual teeth, and the local tooth features of the individual teeth using the processor to obtain fused features of the individual teeth, and extract landmarks of the individual teeth according to the fused features of the individual teeth and offset vectors from points in the tooth point clouds to the landmarks using the processor;
   an attention extraction module, configured to fuse the landmarks of the individual teeth and the tooth point clouds, extract tooth attention features using the processor, acquire dentition attention features with the landmarks according to the tooth attention features using the processor, and fuse the dentition attention features with the global dentition features and the local tooth features that are stored in the internal memory using the processor to obtain a point cloud with fused landmarks; and a rigid transformation parameter regression module, configured to acquire pre- and post-treatment rigid transformation parameters according to the point cloud with the fused landmarks and a crown point cloud at a target position using the processor, and obtain a post-treatment crown model prediction result according to the rigid transformation parameters and the crown point cloud at the original position to be treated using the processor, wherein the process of the extracting tooth attention features using the processor, comprises:

mapping tooth features obtained from the fusion of the landmarks of the individual teeth and the tooth point clouds into three tensors through three convolutional layers, performing a matrix multiplication operation on two of the tensors to calculate point-wise attention and channel-wise attention, multiplying the point-wise attention by the other tensor, multiplying the channel-wise attention by the other tensor, and adding products of the two multiplications to obtain the tooth attention features.

\* \* \* \* \*